Feb. 4, 1930. J. J. SANTIAGO 1,745,650
EXPANDING ROLLER UNDERREAMER
Filed Oct. 19, 1927 3 Sheets-Sheet 1
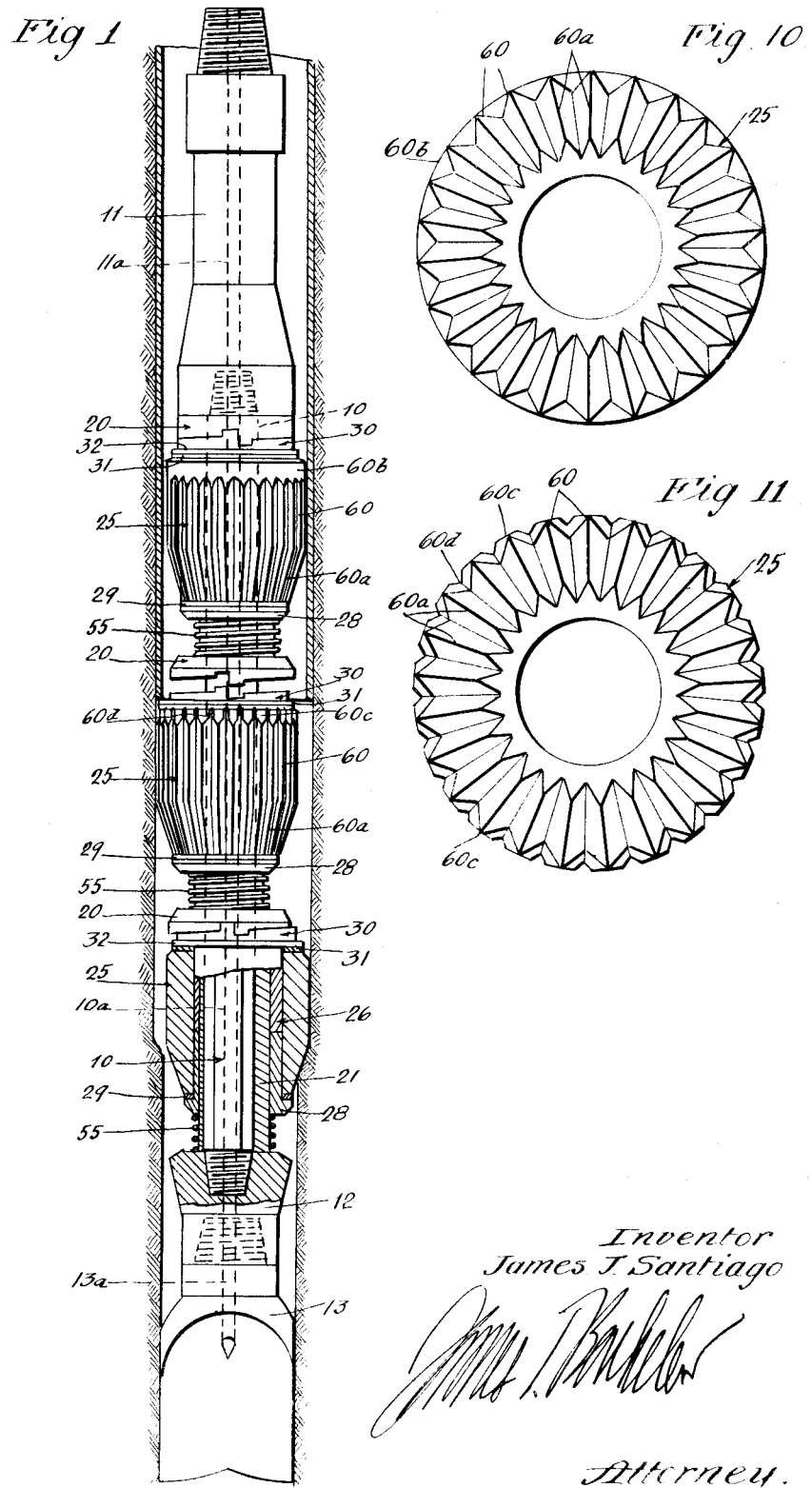
Inventor
James J. Santiago
Attorney.

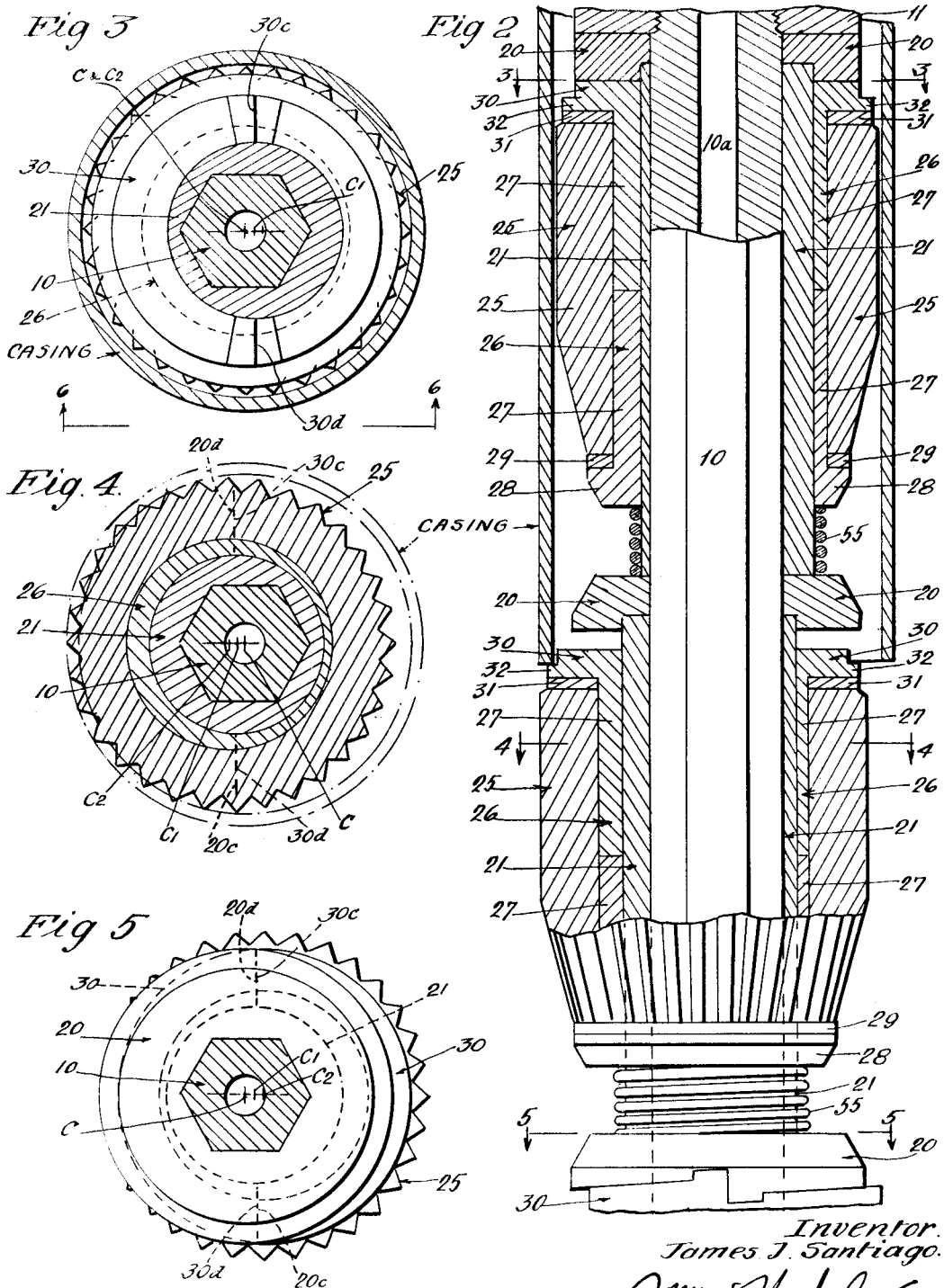

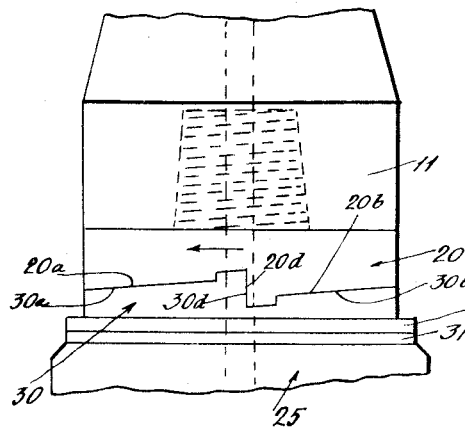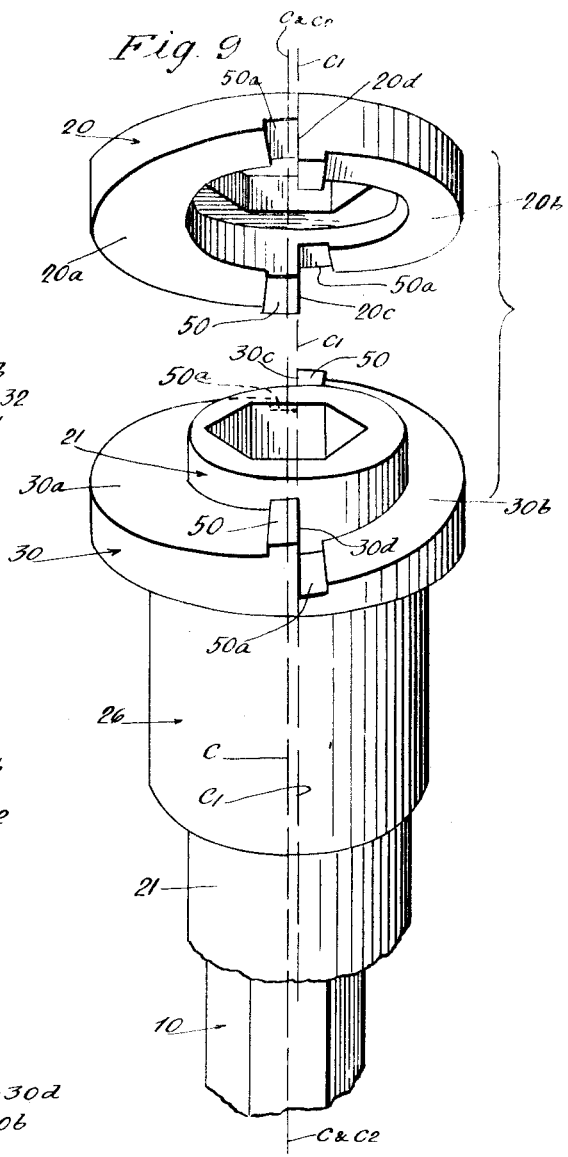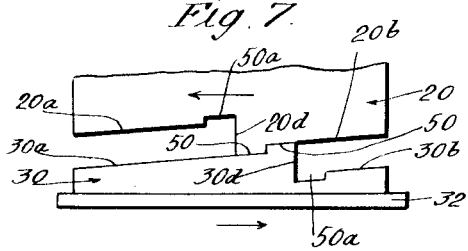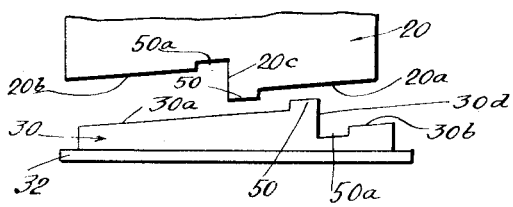

Patented Feb. 4, 1930

1,745,650

UNITED STATES PATENT OFFICE

JAMES J. SANTIAGO, OF LOS ANGELES, CALIFORNIA, ASSIGNOR TO JOHN GRANT, OF LOS ANGELES, CALIFORNIA

EXPANDING ROLLER UNDERREAMER

Application filed October 19, 1927. Serial No. 227,106.

This invention relates to well reamers and more particularly to rotary expanding underreamers. The invention takes its typical form using a roller cutter; and although the invention is not necessarily limited to the use of a roller cutter, or of a roller cutter that completely surrounds a mandrel or body, as will hereinafter appear, I shall explain the invention specifically in that particular embodiment as its characteristic features may perhaps be most fully understood from an understanding of that embodiment.

In certain of its features the underreamer here described is broadly similar to that set out in the application of John Grant, entitled Expanding roller underreamer, Serial Number 122,340, filed July 14, 1926. In said Grant application there is described a single body mandrel on which one or more roller cutters are longitudinally movable, the cutters or cutter rollers surrounding the body mandrel and their longitudinal movement serving to move them onto larger or relatively offset portions of the mandrel and thereby to move them into expanded positions. The major distinction between the underreamer of my present application and the prior application of Grant resides in the manner of moving the cutters or cutter carriers to and from their expanded positions. It is characteristic of my present invention that the cutters are moved directly laterally to and from their expanded position without the necessity of any accompanying longitudinal movement of the cutters between positions on different parts of the mandrel. By my invention this is done by mounting the cutting element on a member rotatable about an eccentric portion of the mandrel, relative rotation of that member causing the cutter to be expanded or contracted with relation to the mandrel by movement lateral to the mandrel. In the present specific embodiment this direct lateral movement is accomplished by mounting each roller cutter on an eccentric which in turn is itself mounted upon an eccentrically offset portion of the body mandrel; the eccentrics being so relatively proportioned and disposed that in one relative position the cutter carrying eccentric moves the cutter in toward the central axis of the tool (or, in the specific form here described, moves the encircling roller cutter into a position where it is concentric with the tool axis) and in another relative position moves the cutter outwardly to an expanded position.

The invention, in its specific form here described, also embodies certain other features having to do with means for locking or stopping the parts in their expanded or collapsed positions, and with arrangements facilitating the expanding and collapsing movements of the parts.

All of these features and characteristics, together with others, both of a broad and specific nature, will best be illustrated in the following description, reference for this purpose being had to the accompanying drawings, in which:

Fig. 1 is an elevation, with parts in section, of my improved underreamer showing it in a well partially below the lower end of the casing and showing it partially expanded;

Fig. 2 is a fragmentary enlarged longitudinal section of parts of Fig. 1 and in the same aspect as Fig. 1;

Fig. 3 is an enlarged cross-section on line 3—3 of Fig. 2;

Fig. 4 is an enlarged cross section on line 4—4 of Fig. 2;

Fig. 5 is an enlarged cross section on line 5—5 of Fig. 2;

Fig. 6 is a fragmentary side elevation of certain parts shown in Figs. 2 and 3, this figure being taken in the aspect indicated by line 6—6 on Fig. 3 and showing the parts in their typical collapsed position;

Fig. 7 is a similar side elevation showing the same parts tripped and ready to expand;

Fig. 8 is a similar view showing parts in a typical position ready to collapse;

Fig. 9 is a perspective diagram showing the eccentrics and cams and their relationship to one another; and Figs. 10 and 11 are end views of typical roller cutters.

What I may term the body or body mandrel of my underreamer is, for purposes of facile manufacture and assembly, preferably made up of several parts. The interior body core 10 extends longitudinally through the length of the operative parts of the tool, being connected at its upper end to the sub 11 which in turn connects with the drill stem, and connected at its lower end to the sub 12 which is adapted in turn to take the drilling bit 13 that drills ahead of the reamer. A circulation passage 11$^a$, 10$^a$ extends through sub 11 and core 10 to connect with passage 13$^a$ of the bit. Interior core 10 may preferably be polygonal in cross-section, a hexagonal shape being suitable; although any other form may be used which will give rotary driving engagement with the parts assembled on the core. On this core are assembled the several parts which are stationary with relation to the body or mandrel or which may be regarded operatively as forming a part of the body or mandrel. Immediately beneath sub 11 there is a cam disk 20 which fits over hexagonal core 10 so as to be locked against relative rotation. Next beneath this cam disk is a relatively stationary eccentric sleeve 21 which also fits non-rotationally upon hexagonal core 10. This cam sleeve 21 is of some longitudinal extent, long enough to accommodate the length of the relatively rotating eccentric which carries the cutter; and the lower end of cam sleeve 21 rests upon the next lower stationary cam disk 20 which is essentially and functionally the same as cam disk 20. Then next below the cam disk 20 is the relatively stationary eccentric sleeve 21 which in turn rests at its lower end upon the next relatively stationary cam disk 20. From what I say hereinafter it will be understood that a complete expansive reamer constructed in accordance with my invention may involve any desired number of cutters and cutter assemblies spaced along the length of the mandrel body. As an illustration I here describe a reamer made up of three cutter assemblies and therefore three sets of stationary cam disks and stationary eccentric sleeves. Thus, in this triple cutter assembly, the lowermost eccentric sleeve 21 has its lower end resting directly upon the lower sub 12. The two subs 11 and 12, attached to the upper and lower ends of the longitudinal core 10, serve to hold the parts 20, 21, etc., in proper longitudinal positions, preventing any vertical movement or looseness of those parts that surround the longitudinal core.

The relative angular positions of the eccentric sleeves 21 about the central axis of the tool (the central axis of core 10) determine the relative angular positions of the cutters when contracted or expanded. In a triple cutter reamer it is desirable that the three cutting points or lines be spaced from each other by certain angles so that the horizontal radial thrusts upon the cutters shall be as nearly as possible balanced. In the specific arrangement here shown the three eccentric sleeves are set with their centers at 180° from each other so that the uppermost and lowermost cutters expand to one side of the body and the intermediate cutter expands towards the opposite side of the body, two of the cutters thus having cutting engagement with the strata along a line at one side of the hole and the other intermediate cutter having such cutting engagement along a line at the opposite side of the hole. But it will be seen from what I have said that the specific construction here described facilitates other relative angular placements of the eccentric sleeves; and it is also only a matter of lengthening the body core 10 and of assembling any selected number of cutter assemblies thereon, to obtain as many cutters as desired and to arrange them in any of several relative angular dispositions. For instance, the hexagonal shape of the core allows duplicate eccentric sleeves to be placed at angular spacings to either 60°, 120° or 180°.

With these understandings a specific description of the construction and mode of operation of one of the cutter assemblies will lead to a clear understanding of the operation of the whole reamer.

Each cutter assembly embodies, in addition to a cam disk 20 and an eccentric sleeve 21, a sleeve 26 that rotates about the center $C^1$ of eccentric sleeve 21, and a cutter mounted on sleeve 26 in such relation to the rotational center $C^1$ that rotation of sleeve 26 will move the cutter in and out with relation to the main center C of the whole tool. In the particular embodiment here described the cutter is in the form of a roller 25 which completely surrounds and is rotatable on the corresponding revoluble sleeve 26 whose outer roller bearing surface is eccentric to the center $C^1$ of sleeve rotation—specifically, sleeve 26 is, in the form here described, an eccentric sleeve. The rotatable eccentric sleeve is designated as a whole by the numeral 26, but preferably, for purposes of assembly, it is made in two halves 27 which may be inserted longitudinally from opposite ends of the roller cutter, as will be apparent from an inspection of Fig. 2. The lower half 27 of the eccentric sleeve has a flange 28 upon which, with the interposition of a thrust bearing washer 29, the roller 25 is supported. The upper half 27 of eccentric sleeve 26 has a cam head 30 whose upper cam face is formed to cooperate with the lower cam face of the corresponding cam disk 20. A thrust bearing washer 31 is also preferably provided between the upper end of the roller 25 and the under face of head 30; and cam head 30 is also preferably provided with a flange 32 whose upper face is adapted to be engaged by the lower end or shoe of the casing. Springs 55, two of them resting on cam heads 20 and the third resting on sub 12, surround the lower ends of sleeves 21 and press upwardly on the lower heads of sleeves 26.

The general nature and inter-action of the cam disk and head and of the eccentric may best be understood by reference to Fig. 9 in connection with Figs. 2 and 3. Fig. 2 shows the uppermost cutter assembly contracted, as does also Fig. 3, and the perspective of Fig. 9 shows the parts in corresponding positions.

In Fig. 9 a center line of the tool as a whole and of the body core 10, is designated C—C. The center line of the relatively stationary eccentric sleeve 21 is designated $C^1$—$C^1$, the eccentricity of sleeve 21 being represented by the distance between those two center lines. In Fig. 3 the center of sleeve 21 is designated by the point marked $C^1$, and the center of the tool as a whole and of the body core is designated by the point marked C. The eccentricity of rotating eccentric sleeve 26, with relation to eccentric sleeve 21 on which it rotates, may preferably be equal to the eccentricity of sleeve 21 with relation to the center of the tool; and therefore, in Figs. 3 and 8, which show the collapsed position, the center line of sleeve 26 coincides with center line C—C of the whole body. That center line therefore, in Fig. 8, is also marked $C^2$—$C^2$. In Figs. 4 and 5, the parts are shown expanded and all three centers are correspondingly marked. In Fig. 4 the centers $C^1$ and $C^2$ are to the left of center C, as the expansion of the intermediate cutter assembly takes place toward the left in the figures; while in Fig. 5 the centers $C^1$ and $C^2$ are shown to the right of center C, as that figure represents the lowermost assembly which expands toward the right.

The interengaging cam disk 20 and cam head 30 may be broadly considered as being two interengaging face-ratchets, each having two teeth and two angular or spiral surfaces of rather flat pitch. The general nature of this structure will be understood from the drawings. Thus the cam disk 20 has two spiral surfaces $20^a$ and $20^b$, with two opposite ratchet shoulders $20^c$ and $20^d$. Correspondingly, the cam head 30 has two spiral surfaces $30^a$ and $30^b$ and two opposite ratchet shoulders $30^c$ and $30^d$. In the collapsed position of the parts these two interengaging cam elements fit together and interengage in the manner as is indicated from their relative positions shown in Fig. 9 and in the manner that is fully shown in Fig. 6. Thus, the spiral cam surfaces $20^a$ and $30^a$ interengage, the cam surfaces $20^b$ and $30^b$ interengage, and the shoulders interengage, $20^c$ with $30^c$ and $20^d$ with $30^d$. In operation the tool is always rotated right-handedly, looking down upon it; and the engagement of these shoulders prevents the right-hand rotation of cam disk 20 with relation to cam head 30. To lock the two cam elements against relative rotation in either direction, the cam faces, at the shoulders, may further be provided with interengaging lugs and recesses 50 and $50^a$.

From what has now been described, it will be readily understood, when the parts are in the relative position shown in Figs. 3, 6 and 9, that the rotatable eccentric sleeve 26, and therefore the roller cutters 25, are centered upon center line C of the whole tool; and that a rotation of sleeve 26 through 180° around center $C^1$ of sleeve 21, will throw the center $C^2$, of sleeve 26 and of the roller, from center C over to such a position as is shown at $C^2$ in Figs. 4 and 5. That is, a rotation of 180° from the position of Fig. 3 will throw the center $C^2$ out to a position where the effective eccentricity of the roller carrying surface of sleeve 26, and therefore the eccentricity of the roller, with relation to main center C, becomes the sum of the eccentricities of sleeve 21 and rotatable sleeve 26.

Assuming now that the parts are in their relatively collapsed positions and it is desired to expand them after putting the tool down through the casing, the cam head 30 is forced down far enough to disengage the shoulders $20^c$, $30^c$ and $20^d$, $30^d$; and the parts are relatively rotated so that they will come to the positions shown in Fig. 7, with the lugs 50 passed over each other, and those lugs riding on the spiral cam surfaces as shown in that figure. The spring 55 tends at all times to press together the two inter-engaging cam faces. In the relative position shown in Fig. 7, with eccentric 26 rotated slightly from its collapsed position, the tool is passed down through the casing, as the cutters are then substantially concentric with the tool axis C. Upon passing out of the lower end of the casing, and upon the tool being rotated right-handedly, the drag upon the roller and upon the cam heads 30 tends to drag those cam heads around in the relative direction indicated by the arrow in Fig. 7, or conversely, tends to allow cam disk 20 to rotate ahead relatively in a right-handed direction, in the direction indicated by the arrow in Fig. 7. This relative drag, or even the inertia of the parts, would throw the sleeves and cutters around to expanded positions unassisted by the cam actions. But at the same time the spring pressure which forces the two cam surfaces together tends at all times to work the two cam elements around in the same relative directions; and the immediate result of all these actions is to cause relative rotation of cam head 30 around in the direction indicated by the arrow in Fig. 7 and through approximately a half revolution with relation to cam disk 20, until the ratchet shoulder $30^c$ of cam head 30 comes up against ratchet shoulder $20^d$ of cam disk 20, and ratchet shoulder $30^d$ of cam head 30 comes up against ratcheted shoulder $20^c$ of cam disk 20. Just as this occurs the lugs 50 drop into the notches $50^a$ and the parts are rotatively locked together in a position 180° removed from their collapsed positions; and the cutters are correspondingly moved out in expansion, as before explained. When the parts are tripped to the position of Fig. 7, ready to expand, the rotary expansive action can be aided by temporarily greasing the spiral cam surfaces, so that the parts will readily slide over each other.

To collapse the reamer it is pulled upwardly until shoulder flange 32 of cam head 30 comes into engagement with the bottom of the casing. The tool is then being moved up slowly and rotated at the same time; so that the cam head 30 is not only pushed down far enough to disengage the ratchet shoulders, but having been so pushed down, and the tool continued to be rotated, and upward motion stopped if desired, friction with the bottom of the casing drags the cam head 30 back, or relatively allows the cam disk 20 to rotate ahead in a right-handed direction, until the parts are thrown around to or near the relative positions shown in Fig. 3. When the parts are near these positions, they are nearly collapsed, and the cutter can then, under the impulse of its spring, move up into the bottom of the casing, and pass on up through the casing. It will be understood that this operation of collapsing the cutters is repeated for each cutter, and when the collapsing action has been completed for the lowermost cutter, then all the cutters are lined up at least substantially with their axes on the central axis C of the whole tool.

Fig. 2 shows the intermediate cutter assembly in the act of being collapsed, its head 30 being shown moved down to disengage the ratchet shoulders. Upon rotation of the tool, with the parts in the position shown in that figure, the cam head 30 drags around to such a relative position as shown in Fig. 8 and then when the parts are sufficiently collapsed they spring up inside the lower end of the casing, bringing the cam head 30 up into engagement with the cam disk 20, as before explained.

Considering the invention in one of its broader aspects, it will be seen that it is not necessary that cutter 25 be a rolling cutter which rotates upon the eccentric sleeve 26, or a roller cutter which surrounds the eccentric sleeve 26. Broadly speaking, the cutter may be of any nature and mounted upon the eccentric sleeve 26 in any manner. It is the relative rotation of sleeve 26 about center C¹ that moves the cutter in and out, moving the cutter laterally with relation to the mandrel; and it will so move the cutter laterally regardless of the nature of the cutter and regardless of whether the cutter is a roller or has rotating bearing upon the sleeve. It is only for the preferred provision of a surrounding roller cutter that the sleeve 26 has an eccentric outer surface.

However, in a more specific aspect, the construction lends itself readily, not only to the cutter encircling the rotatable eccentric sleeve, but also to the cutter rotating upon that sleeve as a bearing. Consequently, in one of its specific aspects, although not necessarily, this invention is characterized by a cutter or a roller cutter, surrounding or rotatable around an eccentric sleeve which acts as a cutter carrier and expands and contracts the cutters by its eccentric rotation.

Using such roller cutters which completely surround the sleeve and which are of a diameter only slightly less than the interior diameter of the casing, it is desirable to form the cutters in such a manner that, although they have sharp cutting edges for action upon the strata, at the same time their cuttting teeth will not cut into or score the casing. Thus, I provide such rolling cutters, at some point along their lengths, with relatively flat and untoothed portions. Such a relatively untoothed portion may conveniently be located at or near the end of such a cutter. The uppermost roller cutter, as in Fig. 1, and of which an end view is shown in Fig. 10, has a main cylindrical portion with straight parallel teeth 60, a downwardly tapering lower portion with downwardly convergent teeth $60^a$ and an upper plain untoothed portion $60^b$. The next lower roller, as shown in Fig. 2, and of which Fig. 11 is an end view, has its upper and comparatively untoothed portion $60^c$ traversed longitudinally by small longitudinal cuts or channels $60^d$ which, although affording space for longitudinal water circulation past the roller, are narrow enough that they leave rather large flat surfaces $60^e$ between adjacent channels.

I claim:

1. A tool of the character described, comprising a mandrel having an eccentrically offset portion, a cutter carrier mounted upon and surrounding the offset portion and rotatable thereon, a cutter element on said carrier in such position as to be relatively projected when the carrier is in one rotational position and relatively retracted when the carrier is in another rotational position, said carrier being rotatable through a complete revolution, and releasable means to stop the carrier in either of two rotative positions.

2. A tool of the character described, comprising a mandrel having an eccentrically offset portion, a cutter carrier mounted upon and surrounding the offset portion and rotatable thereon, a cutter element on said carrier in such position as to be relatively projected when the carrier is in one rotational position and relatively retracted when the carrier is in another rotational position, said carrier being rotatable through a complete revolution, and releasable means to stop the carrier in either of two rotative positions corresponding to the projected and retracted positions of the cutter element and spaced from each other by substantially 180° of rotative movement.

3. A tool of the character described, comprising a mandrel, an eccentric sleeve rotatable about the mandrel, a cutter element mounted on said eccentric sleeve, said eccentric sleeve being rotatable throughout a complete revolution, and releasable means for stopping rotation of said sleeve in either of two rotative positions.

4. A tool of the character described, comprising a body, an eccentrically centered rotative cutter carrier rotatable through a complete revolution, a cutter carried by the carrier, and releasable means for stopping rotation of the carrier in a selected position.

5. A tool of the character described, comprising a mandrel, an eccentric sleeve rotatable about the mandrel, a cutter element mounted on said eccentric sleeve, said eccentric sleeve being rotatable throughout a complete revolution, and releasable means for stopping rotation of said sleeve and locking said sleeve in either of two rotative positions.

6. A tool of the character described, comprising a body, an eccentrically centered rotative cutter carrier rotatable through a complete revolution, a cutter carried by the carrier, and releasable means for locking the carrier in a selected rotative position.

7. A tool of the character described, comprising a mandrel, an eccentric sleeve rotatable about the mandrel, a cutter element mounted on said eccentric sleeve, said eccentric sleeve being rotatable throughout a complete revolution, and releasable means for stopping rotation of said sleeve in either of two rotative positions spaced from each other approximately 180° of rotative movement.

8. A tool of the character described, comprising a body, an eccentrically centered rotative cutter carrier rotatable through a complete revolution, a cutter carried by the carrier, and releasable means for locking the carrier in either of two rotative positions spaced from each other approximately 180° of rotative movement.

9. A tool of the character described, comprising a mandrel, an eccentric sleeve rotatable about the mandrel, and a cutter element mounted on said eccentric sleeve, said eccentric sleeve being rotatable throughout a complete revolution, and releasable means for stopping rotation of said sleeve and locking it in either of two rotative positions spaced from each other approximately 180° of rotative movement.

10. In a tool of the character described, a mandrel, an eccentric thereon, a cutter carrying element rotatably mounted around the eccentric and movable longitudinally with reference to the mandrel, and means releasable by such relative longitudinal movement operative to stop the cutter carrier in a selected rotative position.

11. In a tool of the character described, a mandrel, an eccentric thereon, a cutter carrying element rotatably mounted around the eccentric and movable longitudinally with reference thereto, and means on the eccentric and carrier and engageable and disengageable by such relative longitudinal movement and operative to lock said carrier in a selected rotative position.

12. In a tool of the character described, a body, a cutter carrying element eccentrically pivoted on the body, a cutter carried by the carrier, and releasable means to lock the cutter element against rotation in either direction in either of two rotative positions.

13. In a tool of the character described, a mandrel, a cutter carrier rotatively mounted on the mandrel and having thereon a limited longitudinal movement along its axis of rotation, a cutter carried by the carrier, and two cooperating members, one mounted on the mandrel and the other on the carrier and having interengaging shoulders to stop the carrier in a selected rotative position.

14. In a tool of the character described, a mandrel, a cutter carrier rotatively mounted on the mandrel and having thereon a limited longitudinal movement along its axis of rotation, a cutter carried by the carrier, and two cooperating members, one mounted on the mandrel and the other on the carrier and having interengaging lugs and notches to lock the carrier against rotation in either direction in a selected rotative position.

15. In a tool of the character described, a mandrel, a cutter carrier rotatively mounted on the mandrel and having thereon a limited longitudinal movement along its axis of rotation, a cutter carried by the carrier, and two cooperating face ratchets, one mounted on the mandrel and the other on the carrier.

16. In a tool of the character described, a mandrel, a cutter carrier rotatively mounted on the mandrel and having thereon a limited longitudinal movement along its axis of rotation, a cutter carried by the carrier, and two cooperating face ratchets, one mounted on the mandrel and the other on the carrier, each of the face ratchets having two diametrically opposed ratchet shoulders and two spiral cam surfaces.

17. In a tool of the character described, a mandrel, a cutter carrier rotatively mounted on the mandrel and having thereon a limited longitudinal movement along its axis of rotation, a cutter carried by the carrier, and two cooperating face ratchets, one mounted on the mandrel and the other on the carrier, each of the face ratchets having two diametrically opposed ratchet shoulders and two spiral cam surfaces, and also having a lug and a notch adjacent each shoulder, the lugs and notches of the two face ratchets being adapted to interengage to lock the face ratchets against relative rotation.

18. In a tool of the character described, a polygonal mandrel core, a plurality of eccentric sleeves adapted to fit upon the mandrel core in any one of a plurality of the positions angularly spaced about the center of the core, cutter carriers in the form of rotatable eccentric sleeves mounted upon the first mentioned eccentric sleeves, and cutters carried by said eccentric sleeves.

19. In a tool of the character described, a polygonal mandrel core, a plurality of eccentric sleeves adapted to fit upon the mandrel core in any one of a plurality of positions angularly spaced about the center of the core, rotatable eccentric sleeves mounted one on each of the first mentioned eccentric sleeves, and annular roller cutters revolubly mounted on and carried by said rotatable eccentric sleeves.

20. In a tool of the character described, a polygonal mandrel core, a plurality of eccentric sleeves adapted to fit upon the mandrel core in any one of a plurality of positions angularly spaced about the center of the core, cutter carriers rotatively mounted on said eccentric sleeves, cutters carried by said carriers, and means for limiting rotation of said cutter carriers.

21. In a tool of the character described, a polygonal mandrel core, a plurality of eccentric sleeves adapted to fit upon the mandrel core in any one of a plurality of the positions angularly spaced about the center of the core, cutter carriers rotatively mounted on said eccentric sleeves, cutters carried by said carriers and releasable means for locking said eccentric sleeves in a selected rotative position.

22. In a tool of the character described, a polygonal mandrel core, a plurality of eccentric sleeves mounted in longitudinally spaced relation on said core, locking disks mounted on said core, one at the upper end of each eccentric sleeve, the disks and sleeves of each eccentric sleeve, the disks and sleeves being relatively nonrotatable on the core, end members secured to the ends of the core and confining the disks and sleeves longitudinally between them, cutter carriers rotatively mounted on said eccentric sleeves and having heads engaging the locking disks, and cutters carried by said carrier.

In witness that I claim the foregoing I have hereunto subscribed my name this 5th day of October, 1927

JAMES J. SANTIAGO.